(12) United States Patent
Ascari et al.

(10) Patent No.: US 6,237,475 B1
(45) Date of Patent: May 29, 2001

(54) MACHINE FOR PEELING PEARS, REMOVING THEIR CORE, AND CUTTING THEM INTO SEGMENTS

(75) Inventors: Carlo Ascari; Luca Ascari, both of Cavezzo (IT)

(73) Assignee: A.B.L. s.r.l., Cavezzo (IT)

( * ) Notice: Subject to any disclaimer, the term of this patent is extended or adjusted under 35 U.S.C. 154(b) by 0 days.

(21) Appl. No.: 09/529,802

(22) PCT Filed: Oct. 16, 1998

(86) PCT No.: PCT/IT98/00286

§ 371 Date: Apr. 20, 2000

§ 102(e) Date: Apr. 20, 2000

(87) PCT Pub. No.: WO99/20130

PCT Pub. Date: Apr. 29, 1999

(30) Foreign Application Priority Data

Oct. 20, 1997 (IT) .............................................. MO97A0186

(51) Int. Cl.[7] .............................. A23N 4/00; A23N 4/14; A23N 7/00
(52) U.S. Cl. ................................. 99/543; 99/542; 99/545; 99/564; 99/591
(58) Field of Search .............................. 99/547–566, 591, 99/593, 541–545; 403/109; 426/484, 485

(56) References Cited

U.S. PATENT DOCUMENTS

| | | | |
|---|---|---|---|
| 2,056,413 | * 10/1936 | Thompson | 99/591 |
| 3,055,408 | * 9/1962 | Harrer | 99/564 |
| 3,058,502 | * 10/1962 | Loveland | 99/564 |
| 3,211,201 | 10/1965 | Creed . | |
| 3,236,357 | 2/1966 | Anderson et al. . | |
| 3,768,627 | 10/1973 | Anderson . | |
| 4,046,067 | 9/1977 | Loveland et al. . | |
| 5,027,699 | * 7/1991 | Paterson et al. | 99/593 |
| 5,435,238 | 7/1995 | Paterson et al. . | |

FOREIGN PATENT DOCUMENTS 2 533 807   4/1984   (FR) .

* cited by examiner

Primary Examiner—Timothy F. Simone
(74) Attorney, Agent, or Firm—Young & Thompson

(57) ABSTRACT

The present invention relates to an industrial machine used to process a lot of pears, and its object is to obtain an end-item which can be readily stored in vases or containers, or utilized to prepare fruit salads, confectionery products, etc. The work cycle of the machine starts with the automatic collection of the pears from a basin, their successive orientation, the removal of the stem and the related woody part, up to the central core, the external peeling, the removal of the flower, the end cutting, the removal of the central core, and finally the cutting into segments, all of which is done automatically.

19 Claims, 12 Drawing Sheets

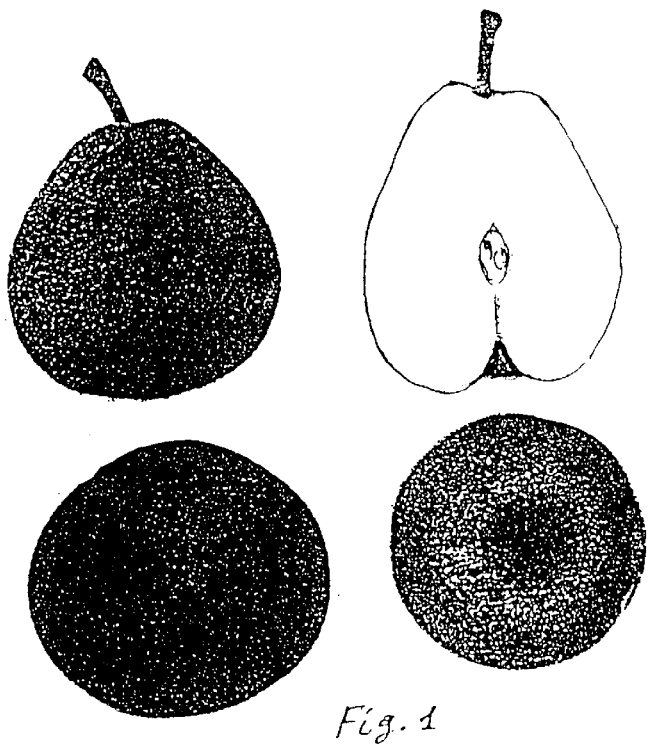
Fig. 1
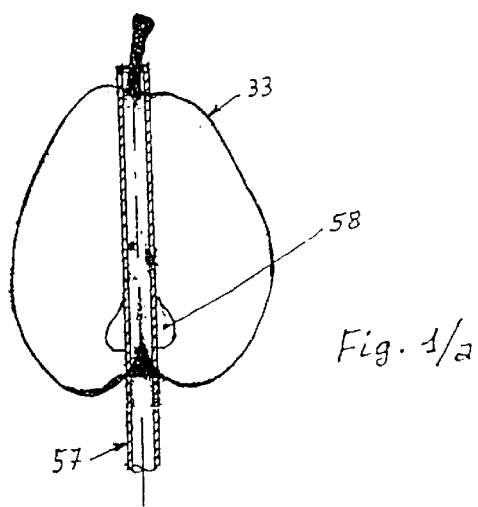
Fig. 1/a
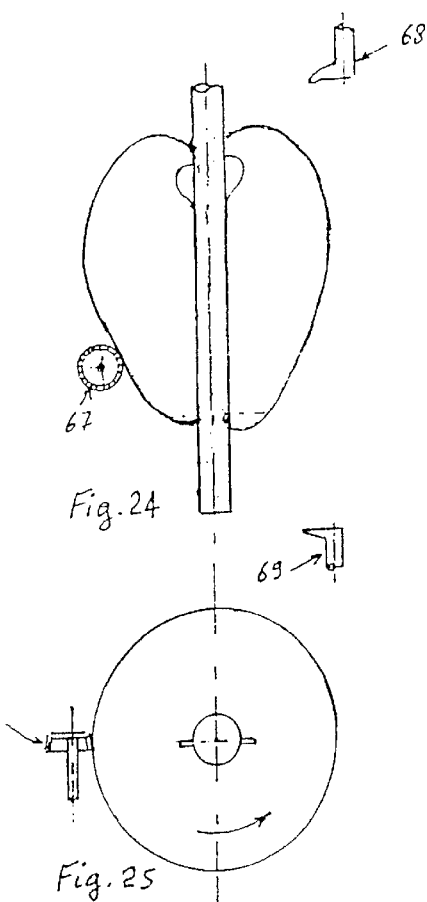
Fig. 24
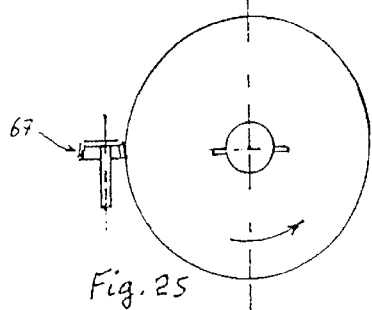
Fig. 25

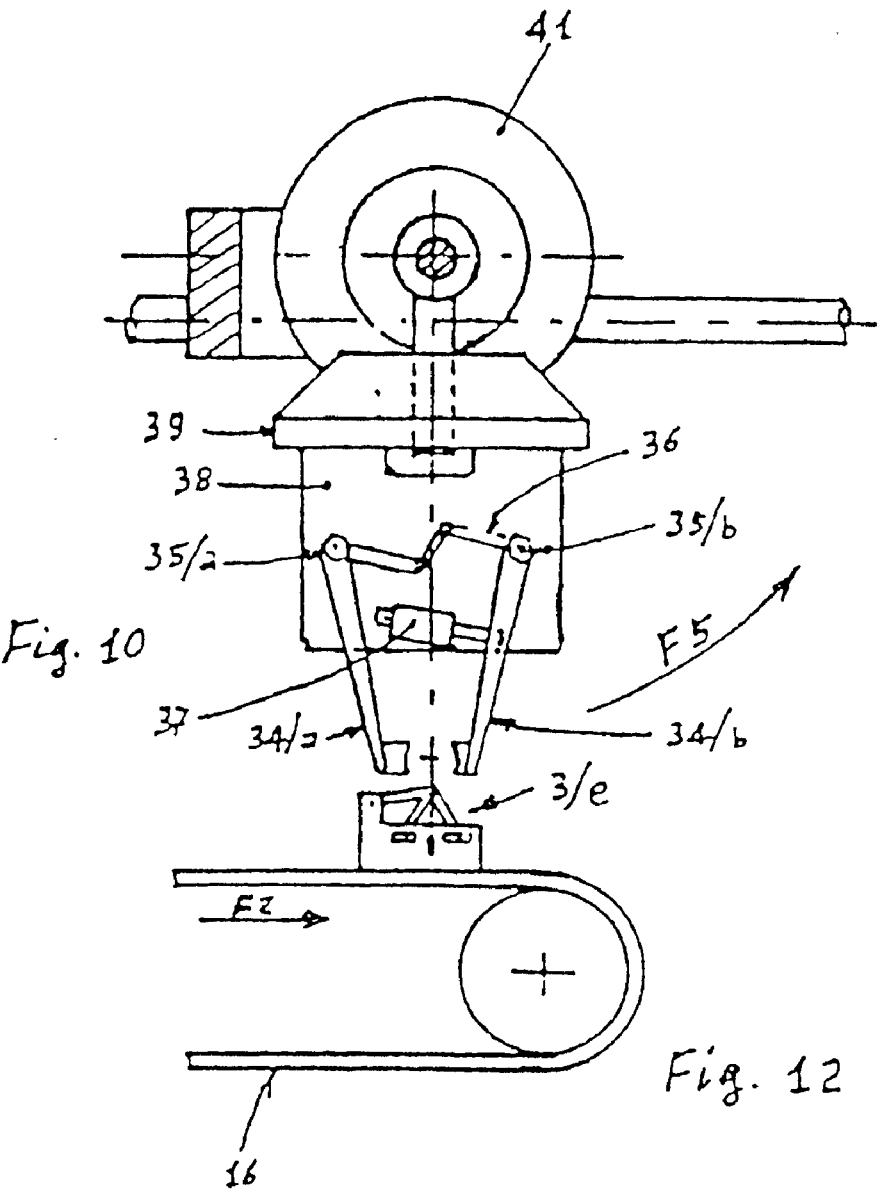
Fig. 10
Fig. 12
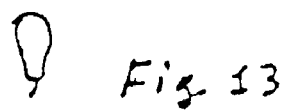
Fig. 13
Fig. 14

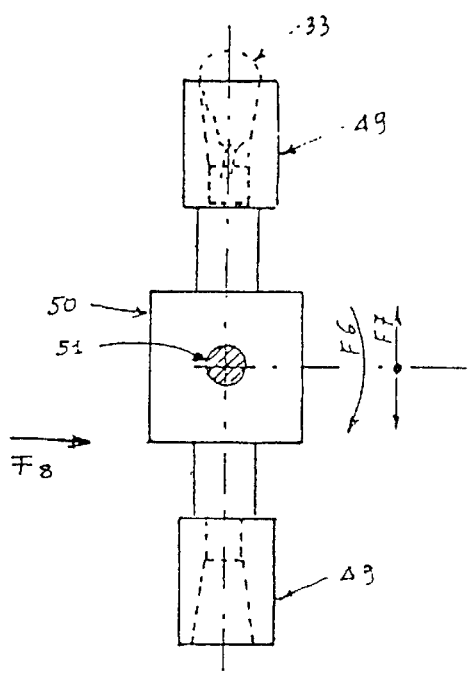
Fig 15/a
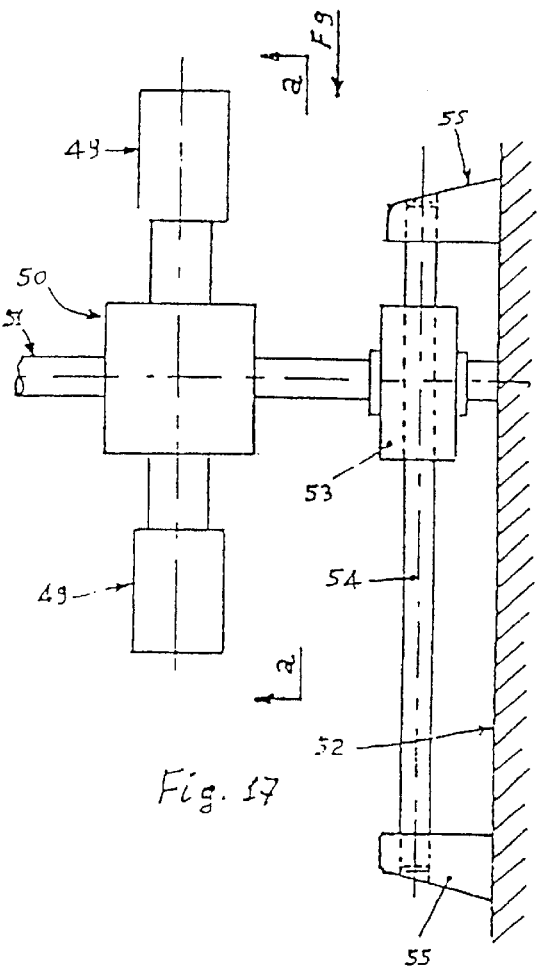
Fig. 17
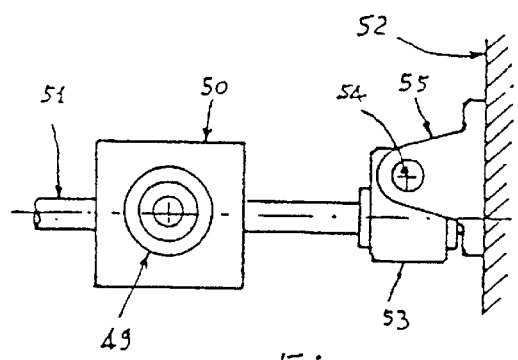
Fig. 18

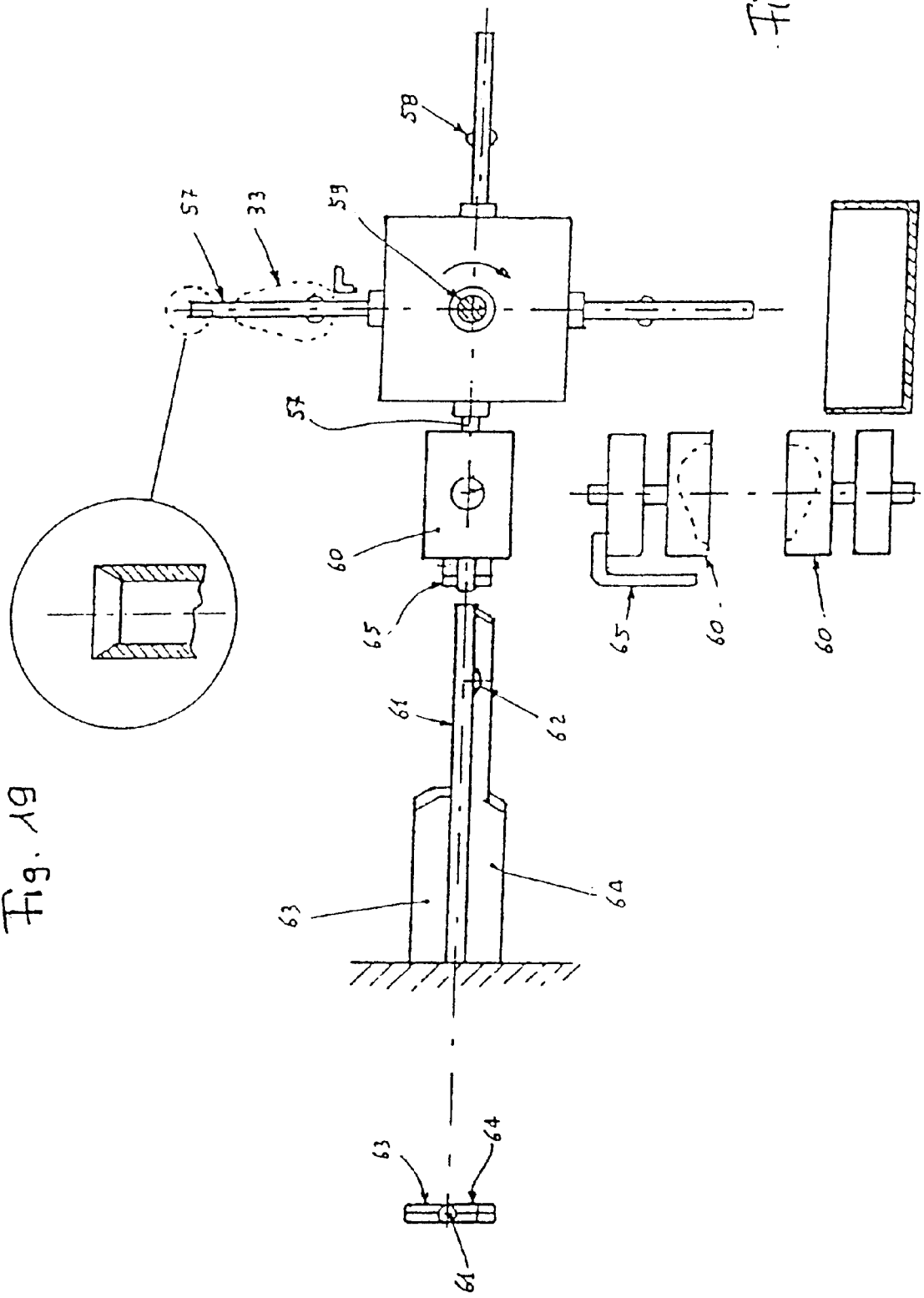

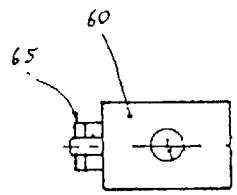
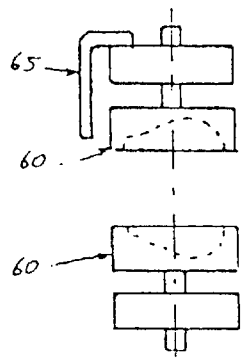
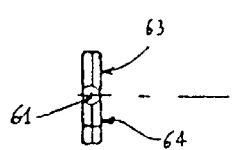
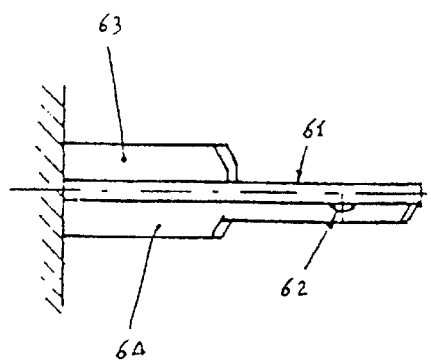

MACHINE FOR PEELING PEARS, REMOVING THEIR CORE, AND CUTTING THEM INTO SEGMENTS

BACKGROUND OF THE INVENTION

1. Field of the Invention

The present invention relates to a machine which is suited to perform automatically, and in a way which is industrially applicable, the following operations on pears:

external peeling;

flower removal;

complete removal of the core, including the elimination of the stem;

end cutting (on the stem side);

subdivision (splitting) into one or more segments.

2. Description of the Related Art

At present, no machine is known, which is suited to perform all the above operations on the pears, including their automatic loading and orientation control, without any intervention of the operator at various stages of the working cycle.

U.S. Pat. No. 5,435,238, corresponding to the closest prior art, discloses a pear processing method and apparatus including several mechanisms for properly orienting the pear prior to coring, peeling and seed celling. After being oriented by a pair of orienting rolls, the pear is held with its stem directed downwardly, and is dropped into a transfer cup.

Thereafter the pear is pushed out of the transfer cup, into a feed cup having three arms grasping and centering the blossom end of the pear.

Subsequently the pear is trimmed by blossom trim means. Then, the feed cup rotates by 90° in order to impale the pear on the coring tube.

On this tube the pear is rotated, the stem of the pear is severed, the peeling is performed, and finally the seed cell of the pear is severed by seed celling knife means.

In contrast to the present application it can be observed that the machine of U.S. Pat. No. 5,435,238 performs almost all operations on the pear while the latter is on the coring tube used to remove the central core. In the present invention, as will be seen by the following detailed description, splitting and seed celling is performed on a spindle which is not tubular.

Moreover, the machine of the present application splits the pear on the same spindle used for seed celling. Instead, the machine of the above mentioned US patent requires a separate slice cup means.

No conveyor is disclosed in the above mentioned US patent, which is used to lift each pear separately from the other pears contained in a storage basin.

U.S. Pat. No. 3,768,627 discloses an apparatus and method used only for orienting pears, wherein a trough support, which is inclined and has diverging walls, is employed.

The side walls of the trough are spaced apart at the bottom, to receive the upper stretch of a belt. If a pear has its bulb end uppermost, it continues to travel uphill and no effect is produced. If the pear has its stem end uppermost, while travelling uphill on the inclined trough, it is rotated. The result is that all the pears are discharged from the trough with their butt ends foremost.

No direct teaching can be obtained from this document in order to arrive at a conveyor which separately lifts the pears from a storage basin, as in the present application.

FR-A-2,533,807 discloses a machine for orienting and displacing pears. There are disclosed means to orient the pears vertically, and inflatable means to hold them firmly inside cups provided on a rotating drum. The rotation of the drum enables to move the pears to successive stations, in order to perform different operations thereon.

Said drum cannot be compared to the rotatable head of the present application, since it has no tubular tool to separate the core.

U.S. Pat. No. 3,211,201 discloses a machine which can perform pear stem end trimming, stemming, peeling, coring, and splitting.

This machine does not perform any orientation of the pears, since the latter are placed stem-end-down by the operator himself.

DISCLOSURE OF INVENTION

An object—even if not the only one—of the present invention, is to realize a machine allowing to perform automatically on the pears, from their feeding to the end-item, all operations required to obtain the end-item, so that the latter can be readily stored in a vase or the like, or used to prepare fruit-salads, etc. Said object is obtained by means of the automatized multiple station transfer machine of the present invention, comprising a plurality of stations, in each of which an operation is carried out, which follows the preceding one, and this being done from the feeding and orientation, until the final cutting into segments. The machine of the present invention is characterized in that it comprises the following principal elements:

a lifting and feeding device for the pears (FIGS. 2–3);

a chain conveyor (FIG. 7) which is characterized by elements (FIGS. 4–5–6) which translate, horizontally orient the pears, and maintain them in this position.

These elements are also adjustable in order to adapt them to the different "gauges" according to which the pears to be processed are subdivided.

special pliers (FIGS. 8–9–10–11) which are suited to displace each pear, from said chain conveyor, to a device for the clamping and concentric locating of the pears (FIG. 15), insuring a vertical position of the pears and an orientation in which the stem is downwardly directed;

said clamping and concentric locating device (FIG. 15) being also suited to insert each pear, one at a time, onto an appropriate element of a rotating head (FIG. 16) comprising four stations;

DESCRIPTION

Machine for peeling pears, removing their core, and cutting them into segments

TECHNICAL FIELD

The present invention relates to a machine which is suited to perform automatically, and in a way which is industrially applicable, the following operations on pears:

external peeling;

flower removal;

complete removal of the core, including the elimination of the stem;

end cutting (on the stem side);

subdivision (splitting) into one or more segments.

BACKGROUND ART

At present, no machine is known, which is suited to perform all the above operations on the pears, including their automatic loading and orientation control, without any intervention of the operator at various stages of the working cycle.

U.S. Pat. No. 5,435,238, corresponding to the closest prior art, discloses a pear processing method and apparatus including several mechanisms for properly orienting the pear prior to coring, peeling and seed celling. After being oriented by a pair of orienting rolls, the pear is held with its stem directed downwardly, and is dropped into a transfer cup.

Thereafter the pear is pushed out of the transfer cup, into a feed cup having three arms grasping and centering the blossom end of the pear.

Subsequently the pear is trimmed by blossom trim means. Then, the feed cup rotates by 90° in order to impale the pear on the coring tube.

On this tube the pear is rotated, the stem of the pear is severed, the peeling is performed, and finally the seed cell of the pear is severed by seed celling knife means.

In contrast to the present application it can be observed that the machine of U.S. Pat. No. 5,435,238 performs almost all operations on the pear while the latter is on the coring tube used to remove the central core. In the present invention, as will be seen by the following detailed description, splitting and seed celling is performed on a spindle which is not tubular.

Moreover, the machine of the present application splits the pear on the same spindle used for seed celling. Instead, the machine of the above mentioned US patent requires a separate slice cup means.

No conveyor is disclosed in the above mentioned US patent, which is used to lift each pear separately from the other pears contained in a storage basin.

U.S. Pat. No. 3,768,627 discloses an apparatus and method used only for orienting pears, wherein a trough support, which is inclined and has diverging walls, is employed.

The side walls of the trough are spaced apart at the bottom, to receive the upper stretch of a belt. If a pear has its bulb end uppermost, it continues to travel uphill and no effect is produced. If the pear has its stem end uppermost, while travelling uphill on the inclined trough, it is rotated. The result is that all the pears are discharged from the trough with their butt ends foremost.

No direct teaching can be obtained from this document in order to arrive at a conveyor which separately lifts the pears from a storage basin, as in the present application.

FR-A-2,533,807 discloses a machine for orienting and displacing pears. There are disclosed means to orient the pears vertically, and inflatable means to hold them firmly inside cups provided on a rotating drum. The rotation of the drum enables to move the pears to successive stations, in order to perform different operations thereon.

Said drum cannot be compared to the rotatable head of the present application, since it has no tubular tool to separate the core.

U.S. Pat. No. 3,211,201 discloses a machine which can perform pear stem end trimming, stemming, peeling, coring, and splitting.

This machine does not perform any orientation of the pears, since the latter are placed stem-end-down by the operator himself.

DISCLOSURE OF INVENTION

An object—even if not the only one—of the present invention, is to realize a machine allowing to perform automatically on the pears, from their feeding to the end-item, all operations required to obtain the end-item, so that the latter can be readily stored in a vase or the like, or used to prepare fruit-salads, etc. Said object is obtained by means of the automatized multiple station transfer machine of the present invention, comprising a plurality of stations, in each of which an operation is carried out, which follows the preceding one, and this being done from the feeding and orientation, until the final cutting into segments. The machine of the present invention is characterized in that it comprises the following principal elements:

a lifting and feeding device for the pears (FIGS. 2–3);

a chain conveyor (FIG. 7) which is characterized by elements (FIGS. 4–5–6) which translate, horizontally orient the pears, and maintain them in this position.

These elements are also adjustable in order to adapt them to the different "gauges" according to which the pears to be processed are subdivided.

special pliers (FIGS. 8–9–10–11) which are suited to displace each pear, from said chain conveyor, to a device for the clamping and concentric locating of the pears (FIG. 15), insuring a vertical position of the pears and an orientation in which the stem is downwardly directed;

said clamping and concentric locating device (FIG. 15) being also suited to insert each pear, one at a time, onto an appropriate element of a rotating head (FIG. 16) comprising four stations;

said rotatable head (FIG. 16) displaces each pear towards said four stations, in each of which the pear is processed;

a special vice (FIGS. 21–21/a), which is suited to pick up each pear from said rotatable head (FIG. 16), and to translate it into a final operating station (FIGS. 22–23), wherein the central core separation and cutting into segments are carried out;

an operating head (FIGS. 22–23) comprising two blades (63–64) for cutting the pear into segments, and a rotatable blade (62) for removing the central core;

a belt conveyor which moves away the (edible and inedible) fruit parts, after the processing operations;

step motion and/or reciprocating motion mechanisms, which are synchronized, and which are suited to move each single component of the machine, and are disposed and structured so as to attain the desired result;

a machine bed (or machine base) enclosing and supporting everything.

The machine operates as follows.

The pears are taken out one at a time from a basin or cistern (1) and are lifted, by means of a stepped chain conveyor (2) having an intermittent motion, until they reach a position where they are seized by pliers (4) which transfer them on a second chain conveyor (FIG. 7), having also an intermittent motion.

The chain conveyor (FIG. 7), which is characterized by elements insuring a horizontal positioning of the pears, but with their stem pointing in one direction (FIG. 13) or in the opposite one (FIG. 14), translates the pears towards a position, where they will be seized by second pliers (FIGS. 8–9–10–11).

Said second pliers, after having seized each pear, orient it according to a vertical direction and with its stem always directed downwardly, irrespective of the orientation of the stem at the seizing time, that is whether it was oriented according to FIG. 13 or 14. The pear is also disposed in a very precise position and is released and handed over to a clamping and concentric locating device (FIG. 15).

The device (FIG. 15) retains the pear by means of self-centering pliers, after receiving it, and orients its axis perfectly in the vertical direction.

The aforesaid device (FIG. 15) rotates around its axis by 180 degrees (so that the pear is still vertically oriented but the stem is upwardly directed), and thereafter it moves downward, thrusting the pear in a tubular tool (57), which is coaxial with the longitudinal axis of the pear.

Said tubular tool (57) separates a small core (in the shape of a circular "carrot"), from the pear body, said small core comprising, besides part of the central core, also the stem and the woody portion connecting the stem to the protective cartilage of the central core.

Said tubular tool (57) is a structural part of a four-station rotatable head (FIG. 16) having an intermittent motion.

In each of the four stations of the rotatable head (FIG. 16), operations are performed by means of appropriate means or tools.

In the first station, as described above, the pear is thrust in the tubular tool, thereby obtaining a first partial removal of the core.

In the second station, the tubular tool is set in rotation, and using known tools the following operations are performed:
I) external peeling;
II) removal of the flower;
III) end cutting (on the stem side).

In the third station, while the tool is stationary (i.e. not rotating any more), the "carrot" is projected outward by a compressed air jet, from the interior of the tubular tool.

In the fourth station, while the tool is stationary and the dragging (entrainment) fins (58) are flush and aligned with the blades (63–64) for cutting the pear into segments, the pear is taken off from the tubular tool (57) by means of the vice (FIG. 21) and is inserted on the tool (FIG. 22) for cutting it into segments and for removing its central core.

In this latter station, after the pear has been partially divided in two halves in the axial direction, by means of the blade (64)—during its insertion on the tool (FIG. 22)—, the central core is separated by the rotating cutter (62).

Thereafter the vice (60) opens and moves to the tubular tool (57) in order to seize the successive pear; the vice closes again, displaces the new pear towards and onto the tool (of FIG. 22); at the same time it pushes the old pear on the wider portion of the blades (63–64), thereby separating it in two pieces or segments; the latter fall on a belt conveyor together with the central core and are taken away by it.

BRIEF DESCRIPTION OF DRAWINGS

Other features of the invention and its advantages will be more clearly explained in the description of a preferred embodiment thereof, which is not exhaustive, and is only shown for illustrative and non limitative purposes in the accompanying drawings, wherein:

FIG. 1 shows a pear, as seen from four different directions, wherein in one of them (front view) the pear is sectioned;

FIG. 1/a shows a sectioned pear, which is longitudinally crossed by the tubular tool performing the first step of core removal;

FIGS. 8, 9 and 10 schematically show in front, plan and side view, respectively, special pliers taking the pears from the chain conveyor and inserting them in a device for clamping and concentric locating, in which the pears are always disposed with their stem directed downwardly;

FIG. 12 schematically shows the position assumed by the chain conveyor of FIG. 7 with respect to the pliers of FIGS. 8, 9, 10;

FIGS. 13 and 14 show the only two positions which may be taken by the pears on the (transfer) chain conveyor, that is: horizontal position with the stem oriented towards one side (FIG. 13) and in the opposite direction (FIG. 14);

FIG. 15/a is identical to FIG. 15, but devoid of the pliers mounted on the "funnels"; it corresponds to the cross-section taken along the plane a—a of FIG. 17;

FIG. 16/a is identical to FIG. 16, but it is only slightly enlarged;

FIG. 17 is an orthogonal (side) view of FIG. 15/a, in the direction of arrow F8;

FIG. 18 is an orthogonal (side) view of FIG. 17 as seen in the direction of the arrow F9;

FIG. 19 is an enlarged sectioned view of the free end of the tubular tool carried by the four-station rotatable head of FIG. 16/a;

FIG. 20 shows, in cross section, a small basin for collecting the cores;

FIGS. 21 and 21/a show, according to two orthogonal views, in plan and front view respectively, the vice which seizes the pears after their peeling;

FIGS. 22 and 23 respectively show, according to two orthogonal views, a side view and an end view of the station for removing the (central) core and for cutting the pear into segments.

FIGS. 24 and 25 show, according to two orthogonal views, a front view and a plan view of the relative positions of the pear and the tools performing the peeling, flower removal, and end cutting;

DETAILED DESCRIPTION OF THE PREFERRED

Figure 2:
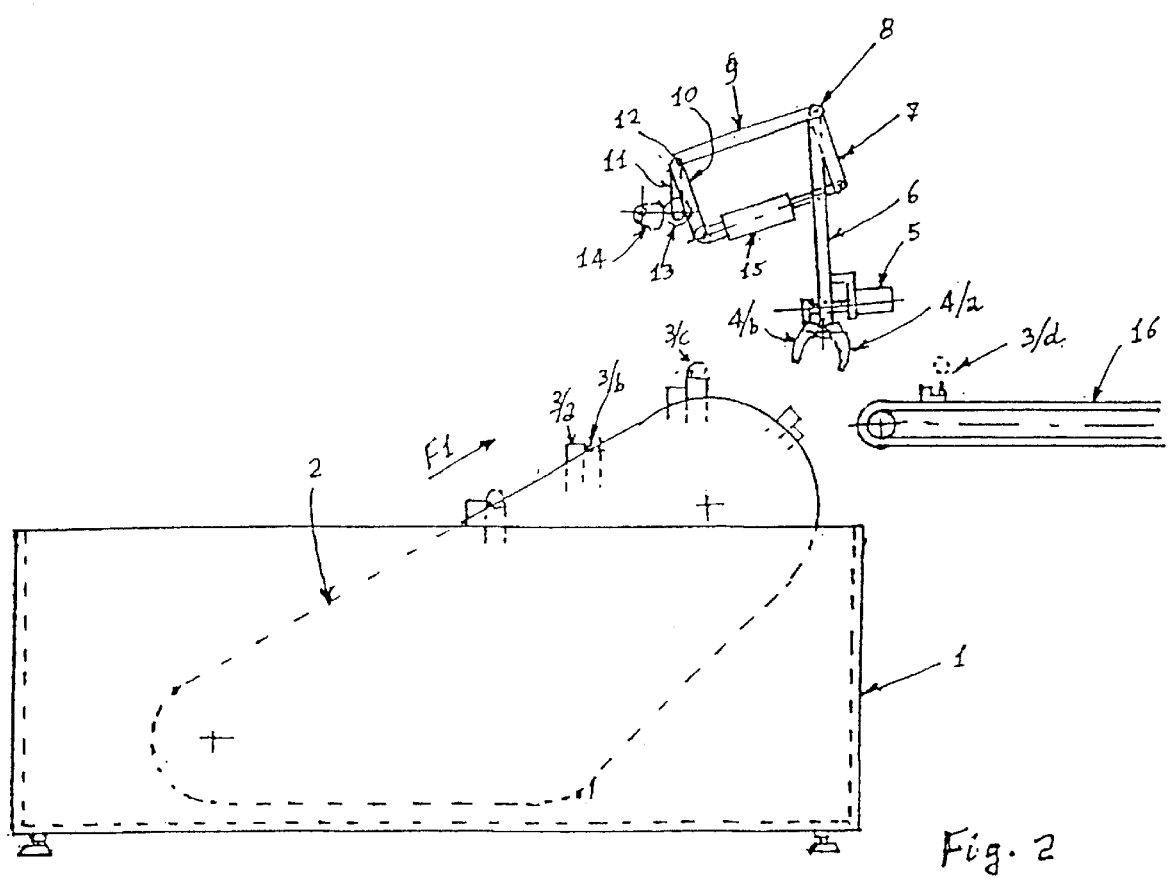
FIGS. 2 and 3 schematically show, in front and plan view respectively, the basin (cistern) containing the pears plunged in water mixed with appropriate additives, and the automatic lifting and feeding device for the pears.

In some of the Figures, some components have been omitted in order to avoid confusion in explaining the invention, moreover, always with the aim of giving a clear and concise description, the annexed drawings do not include neither structural elements which are known nor mechanisms which are known and/or obvious for a skilled person.

Referring to the drawings, the basin for containing the pears and water added with dissolved products for their conservation, is denoted by 1, and the pears are taken off and lifted individually by means of the chain conveyor 2, provided with steps comprising two parts, 3/a and 3/b, wherein part 3/a is fixed and part 3/b is axially movable with respect to part 3/a.

The width of the chain conveyor 2 is designed to contain only one pear. It moves intermittently in the direction indicated by arrow F1.

In the ascending path, step 3/b is located at a lower level with respect to step 3/a and has such a configuration allowing it to retain and carry only one pear; therefore, at the upper end of this "ladder", there arrives only a single pear for each step. Only when reaching the upper end (denoted by 3/c), step 3/b lifts under the action of a cam, and "hands over" the pear to be grasped, to the pliers 4/a–b, which at this instant of time occupy position 3/c.

The pears, carried individually by each step 3/a–b, are almost all disposed horizontally, but their stem is oriented in one direction or the opposite one.

Figure 3:
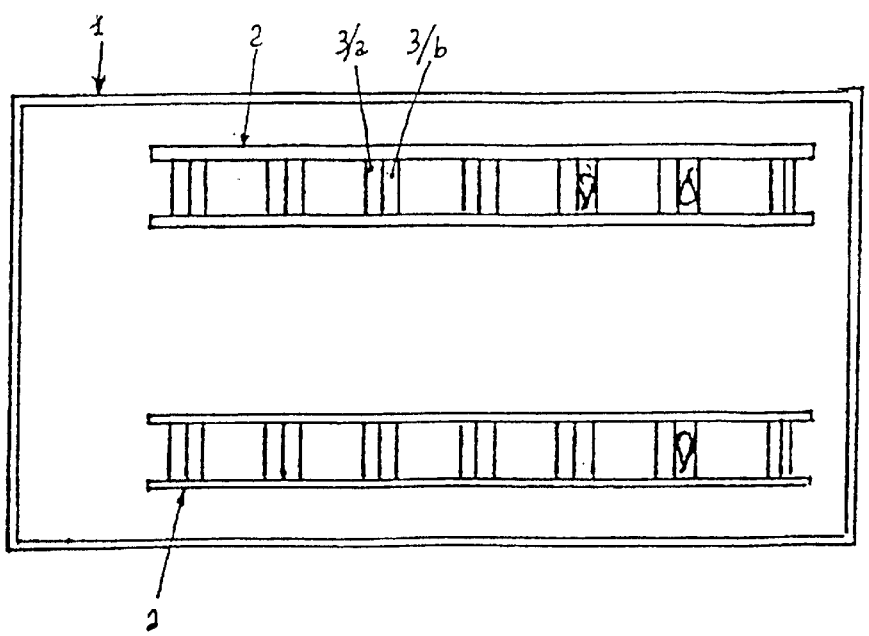

FIG. 3 shows a basin or cistern 1 associated with two chain conveyors 2, applicable to the case of a machine working simultaneously along two rows; in this case, also the devices to be described later on should be "duplicated".

The pliers 4/a–b, and all their structural elements, are supported by the basement or supporting structure of the basin.

The pliers 4/a–b are characterized by:

a fixed jaw 4/a;

a jaw 4/b which is pivotly connected, and is actuated by a linear pneumatic actuator 5, in order to grasp or release the pear;

the fixed jaw 4/a is integral with the lever 6, which is integral with the actuator body 5 and lever 7 by the interposition of a bracket.

the levers band 6 and 7 are pivoted at 8;

at the point indicated by 8, there is also pivotally connected the connecting rod 9, which is integral with the levers 10,11;

the assembly 9–10–11 is pivotally connected at 12;

at the end of 11, a bearing 13 interacts with a cam 14;

the ends of the levers 7 and 10 are connected together by a linear pneumatic actuator 15.

Figure 7:
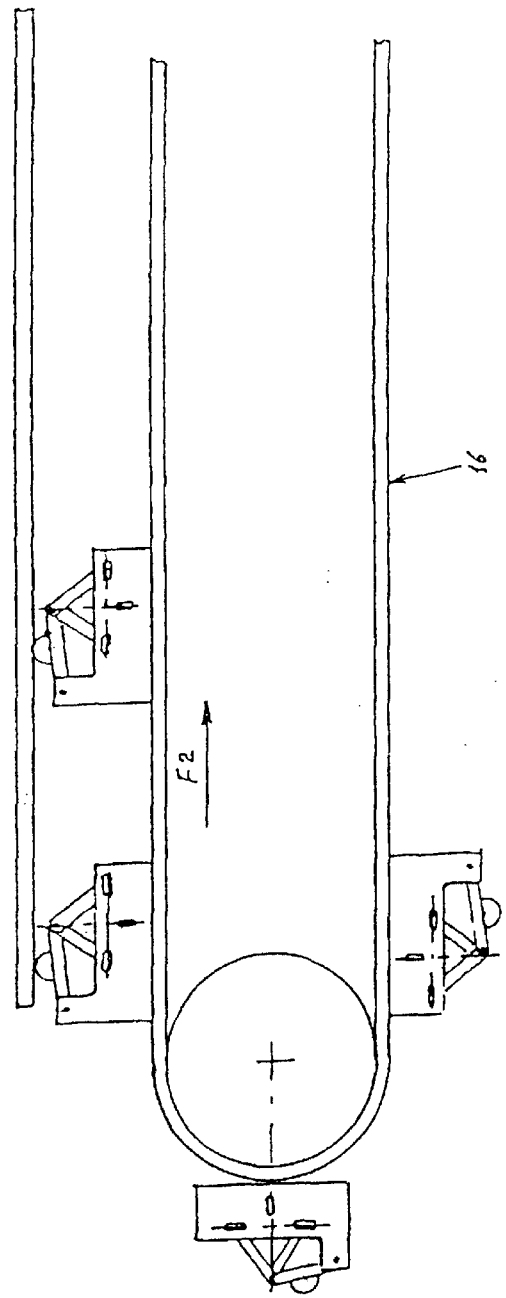
FIG. 7 schematically shows the chain conveyor.
Figure 8:
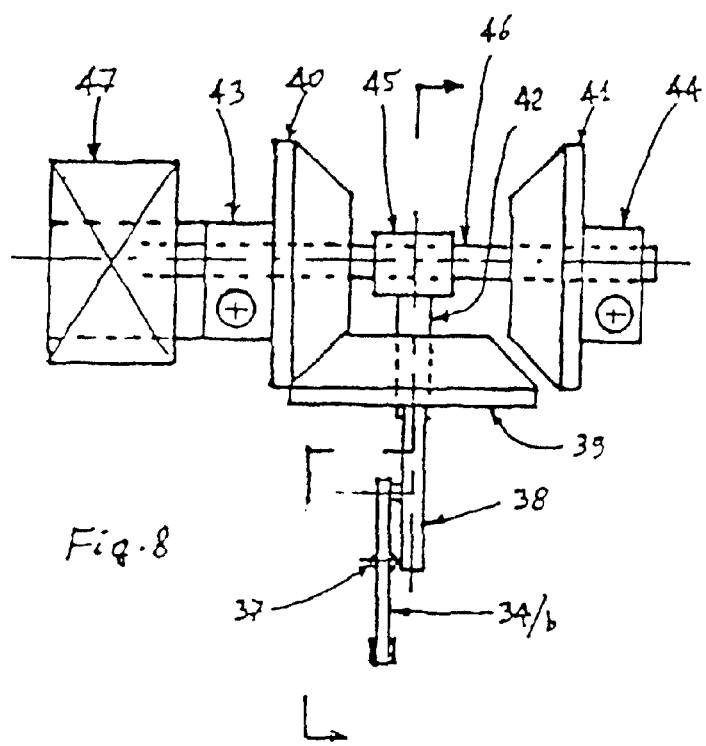
Figure 9:
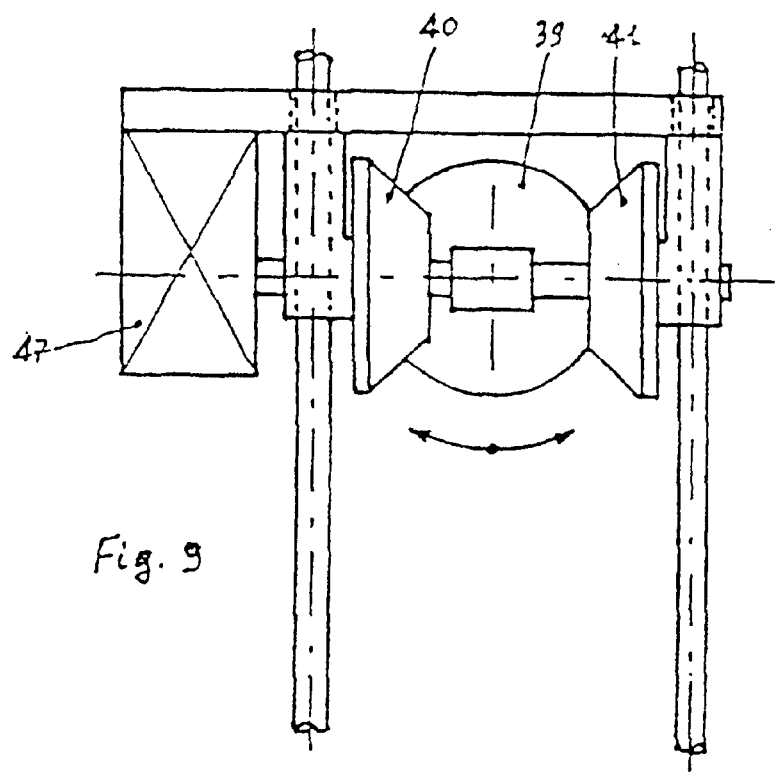

When cam 14 rotates, it lifts and lowers the whole described mechanism; on the other hand, the actuator 15 serves almost only to displace the pliers 4/a–b to the right or to the left (besides lifting them slightly). The assembly is designed to satisfy the following two conditions:

the pliers 4/a–b are positioned at 3/c and are ready to seize a pear at the time step 3/b lifts. The pliers seize the pear, thereafter they lift and move to position 3/d;

the pliers 4/a–b open and release the pear, handing it over to one of the elements of the chain conveyor 16 of FIG. 7.

Figure 4:
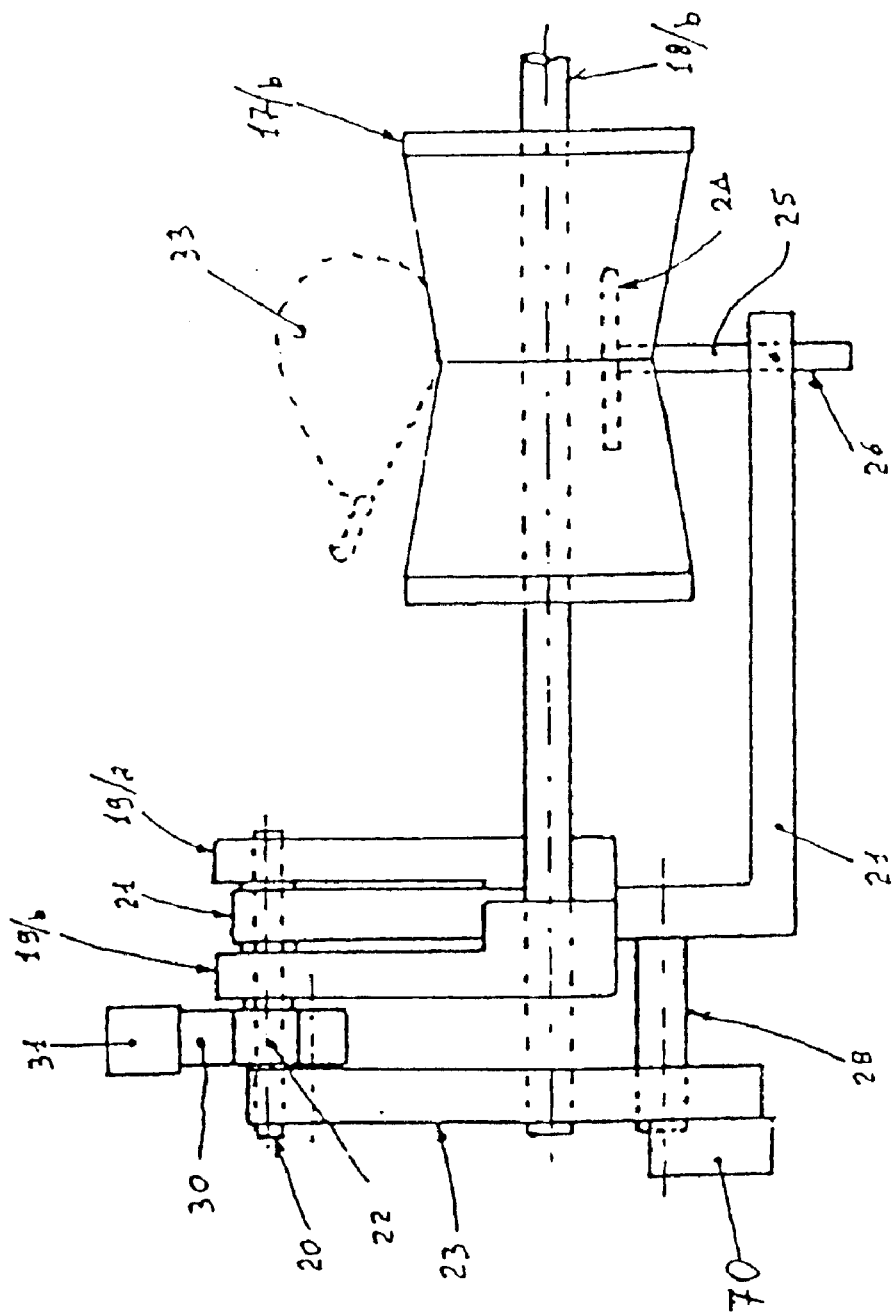
FIGS. 4, 5 and 6 schematically show, according to a front, plan and side view respectively, an element of a chain conveyor used to transfer the pears from the feeding device towards the different stations, by keeping the pears in the horizontally oriented position.

The chain conveyor 2, the pliers 4/a–b and the chain conveyor 16 perform movements which are linked together. The chain conveyor 16 (FIG. 7) is formed by a plurality of elements, one of them being shown in FIGS. 4–5 and 6.

Two rollers 17/a–17/b, each having a double taper converging at the center, are integral with a corresponding spindle 18/a–18/b, which is supported by a respective connecting rod 19/a–19/b, pivotally connected to the pin 20.

A bracket 21 and a connecting rod 22 are also pivotally connected to said pin 20, and the latter connecting rod is pivotally connected to the head portion 23 at its opposite end.

Bracket 21 supports a small plate 24, integral with 25, which is vertically adjustable at 26.

Spindles 18/a–18/b have their ends slidable inside horizontal slots 27/a–27/b obtained on the head portions 23; bracket 21 is integral with a pin 28 whose end slides inside a vertical slot 29, which is also obtained on the head 23; therefore, if the connecting rod 22 is lowered or lifted, rollers 17/a–17/b move away or approach each other, whereas the small plate 24 maintains its position with respect to rollers 17/a–17/b, provided that the operator does not manually change the adjustment at 26.

An adjustment of the mutual distance between the rollers 17/a–17/b becomes necessary when the "gauge" of the lot of pears to be processed changes.

This adjustment is performed as follows.

The connecting rod 22 is upwardly biased by elastic means (springs; pneumatic cylinders; etc) which are not shown. On the connecting rod 22, slidable runners 30 integral therewith, cooperate with the guide 31 connected to the machine bed through height-adjustable means (not shown). The adjustment is performed in conformity with the variation of the "gauge" of the pears to be processed.

Pinions 32 are inserted or integrally formed on the spindles 18/a–18/b.

The chain conveyor 16, which is formed by a certain number of the above described elements, moves intermittently in the direction of the arrow F2 (FIG. 7), and during each stop the rollers 17/a–17/b rotate because the pinions 32 engage a motor driven chain. The only exception is given by the two end positions (where the pears are loaded, i.e. the position 3/d of FIG. 2, and where they are unloaded, i.e. the position 3/e of FIG. 12).

The rotation of the rollers 17/a–17/b insures that the pears 33 supported by the rollers, are oriented so that their axis is horizontal, and that they will maintain this position. The height-adjusted small plate 24 insures that a pear which is released by the pliers 4/a–b (FIG. 2), does not wedge vertically between the rollers 17/a–17/b, even if it falls with its stem directed downwardly.

Figure 5:
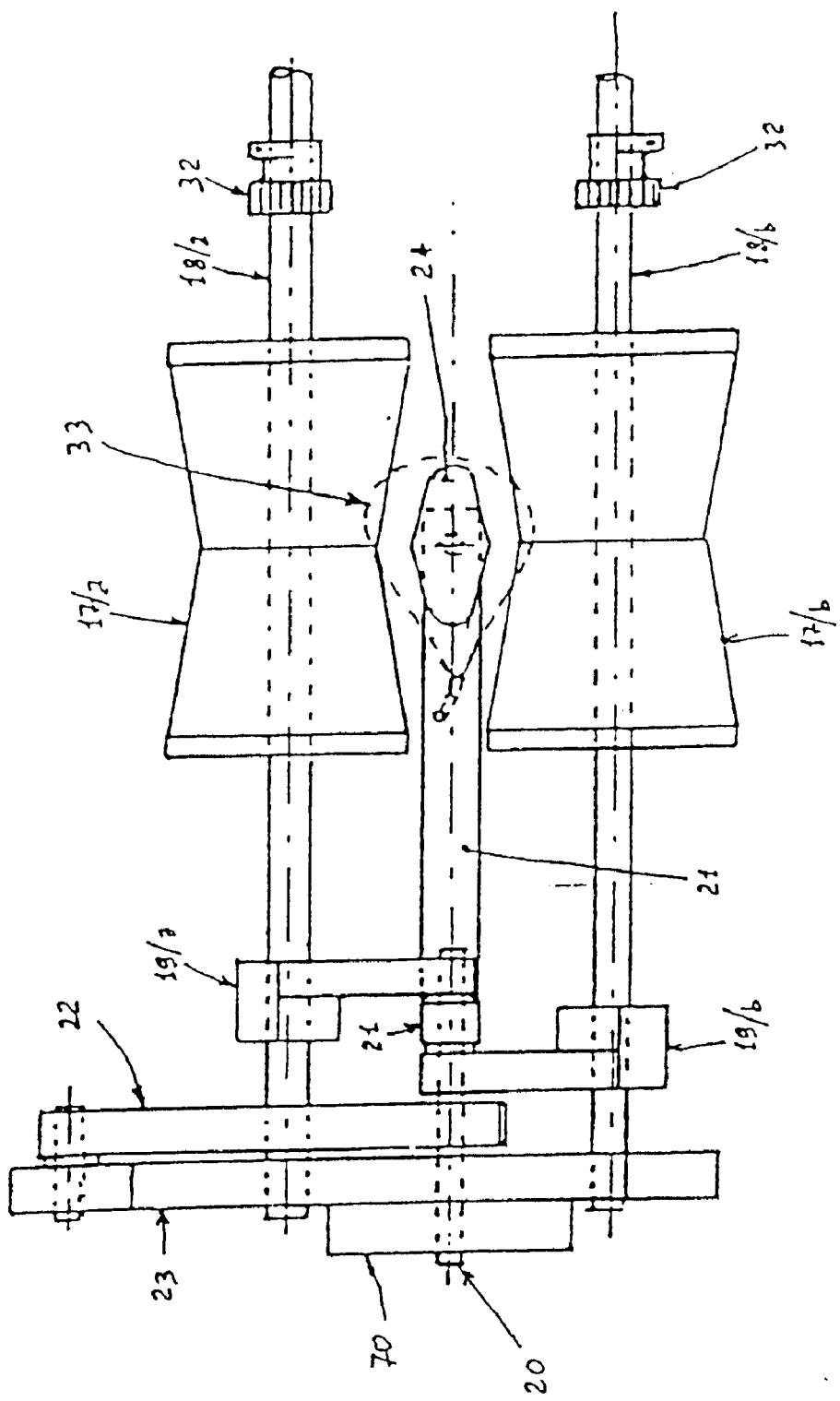
Figure 6:
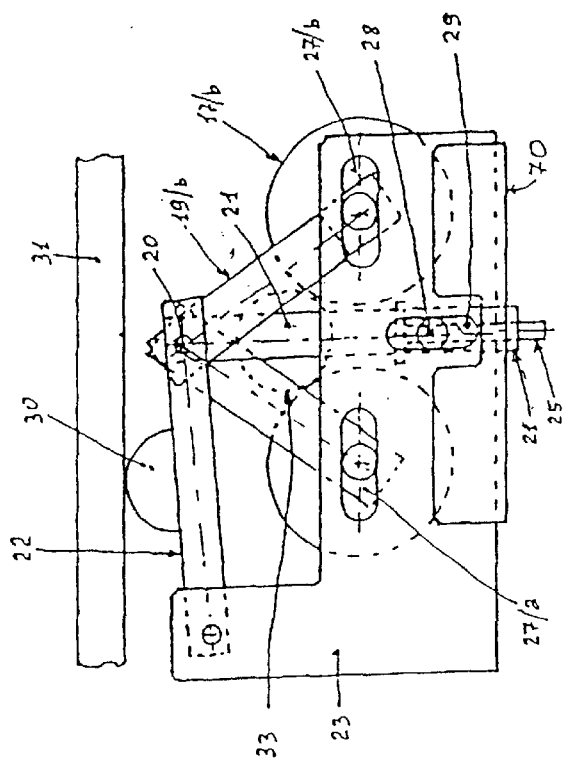

When the machine is realized in such a way as to work simultaneously along two rows, the spindles 18/a–18/b are sufficiently long, so that, in the position indicated by the arrow F3, there will be a second pair of rollers 17/a–17/b; and the second assembly—formed by the connecting rods, levers, head portions, etc.—will be located in the position indicated by the arrow F4 (FIG. 5).

The head portions 23 are connected to the plates 70 which on their turn are connected to the chain conveyor 16.

The pears are taken off from the chain conveyor 16, at its end opposite to the loading end (FIG. 12) by means of self-centering pliers (FIGS. 8–9–10–11); the latter comprise two equally sized L-shaped levers 34/a–34/b respectively pivoted at 35/a–35/b, the ends of which are adequately shaped for the intended purpose, on the "pear grasping side", whereas on the other sides, they are connected to the ends of a connecting rod 36.

A linear pneumatic actuator 37, acting on one of the two levers, allows to clamp a pear in a self-centering manner.

The levers 34/a–34/b and the actuator 37 are supported by a plate 38, which is integral with a bevel gear 39, and the latter can selectively engage—under an adequate control—the bevel gear 40 or the bevel gear 41.

Figure 11:
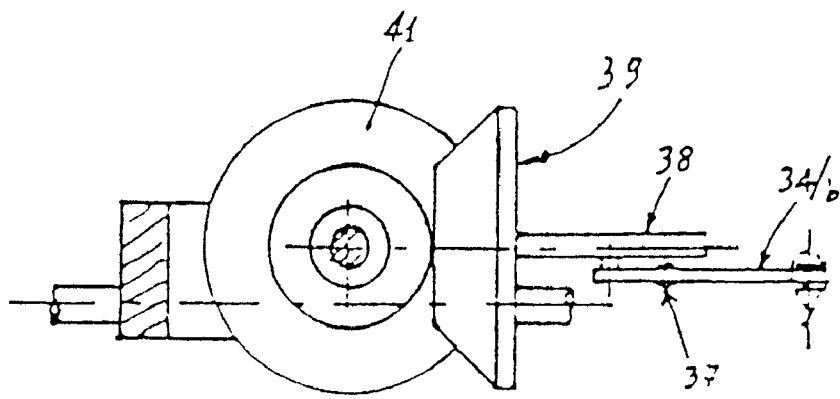
FIG. 11 schematically shows the final position of the pliers of FIGS. 8, 9, 10.

The bevel gear 39 is idle on the shaft 42 whereas the gears 40–41 are integral with the supports 43–44. The shaft 46 can effect two different movements, which are transmitted by known mechanisms contained in the casing 47:

an axial reciprocating movement, in order to engage the gear 39 with the gear 40 or 41;

a rotatory alternative movement (corresponding to ¼ of a complete revolution), in order to rotate the shaft 42 alternatively from the vertical (FIG. 8–9–10) to the horizontal position (FIG. 11).

Simultaneously with the rotation of the shaft 42 from the vertical to the horizontal position in the direction of the arrow F5, the bevel gear 39 (which is coupled to 40 or 41) rotates by ¼ of a complete revolution, so that the pliers 34/*a–b* which have taken a (horizontally disposed) pear from the chain conveyor of FIGS. 10 and 12, will hold the pear in FIG. 11 with the axis of the pear being vertically oriented.

Figure 15:
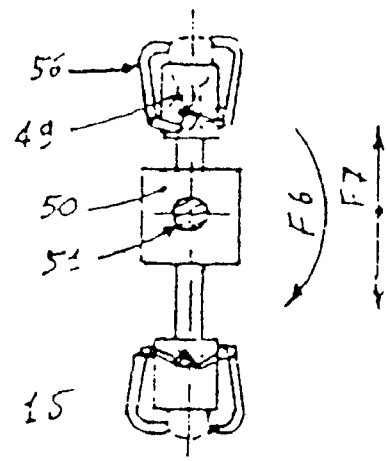
FIG. 15 schematically shows the device for clamping and concentric locating of the pears.

A sensor, which is located in an appropriate position on the chain conveyor 16, detects whether the pear is oriented as shown in FIG. 13 or FIG. 14, and passes a signal to the actuator inside the casing 47, in order to axially displace shaft 46 in the desired direction (engagement of 39 with 40 or 41), and in order to orient the pear always so that its stem is downwardly directed in the cnfiguration of FIG. 11. Therefore, the above described pliers do not only take the pear from the position 3/*e* of FIGS. 10/12 and bring it to a position in which the axis is vertical (FIG. 11), but insure that the pears have always a downwardly oriented stem. It must be noted that FIG. 11 is not an orthogonal view of FIG. 10, instead, both views are on the same plane. The pear in FIG. 11 is perfectly coaxial with a sleeve 49 of the device shown in FIGS. 15–15/*a*–17 and 18. Said device is characterized by two sleeves 49 having a hole in the form of a funnel (FIG. 15/*a*) and which are integrally formed on a body 50 applied to a shaft 51, wherein the latter can rotate intermittently by 180 degrees during each step (arrow F6).

The motion is transmitted to shaft 51 by means of known mechanisms from inside the machine bed or structure 52. Said shaft 51 is mounted at its ends on supports 53 which slide along vertical guides 54, which on their turn are supported by brackets 55 integral with the machine bed.

Figure 16:
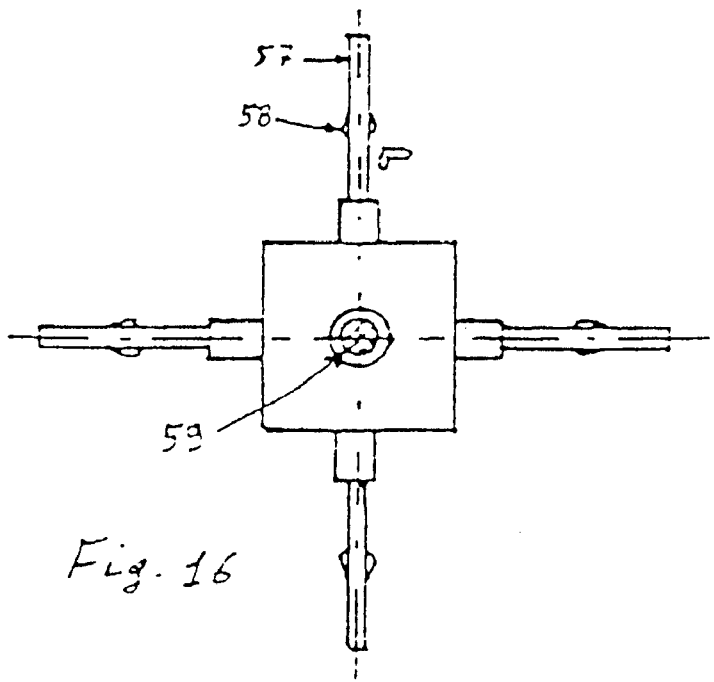
FIG. 16 schematically shows a rotatable head comprising four stations where different operations are performed.
Figure 26:
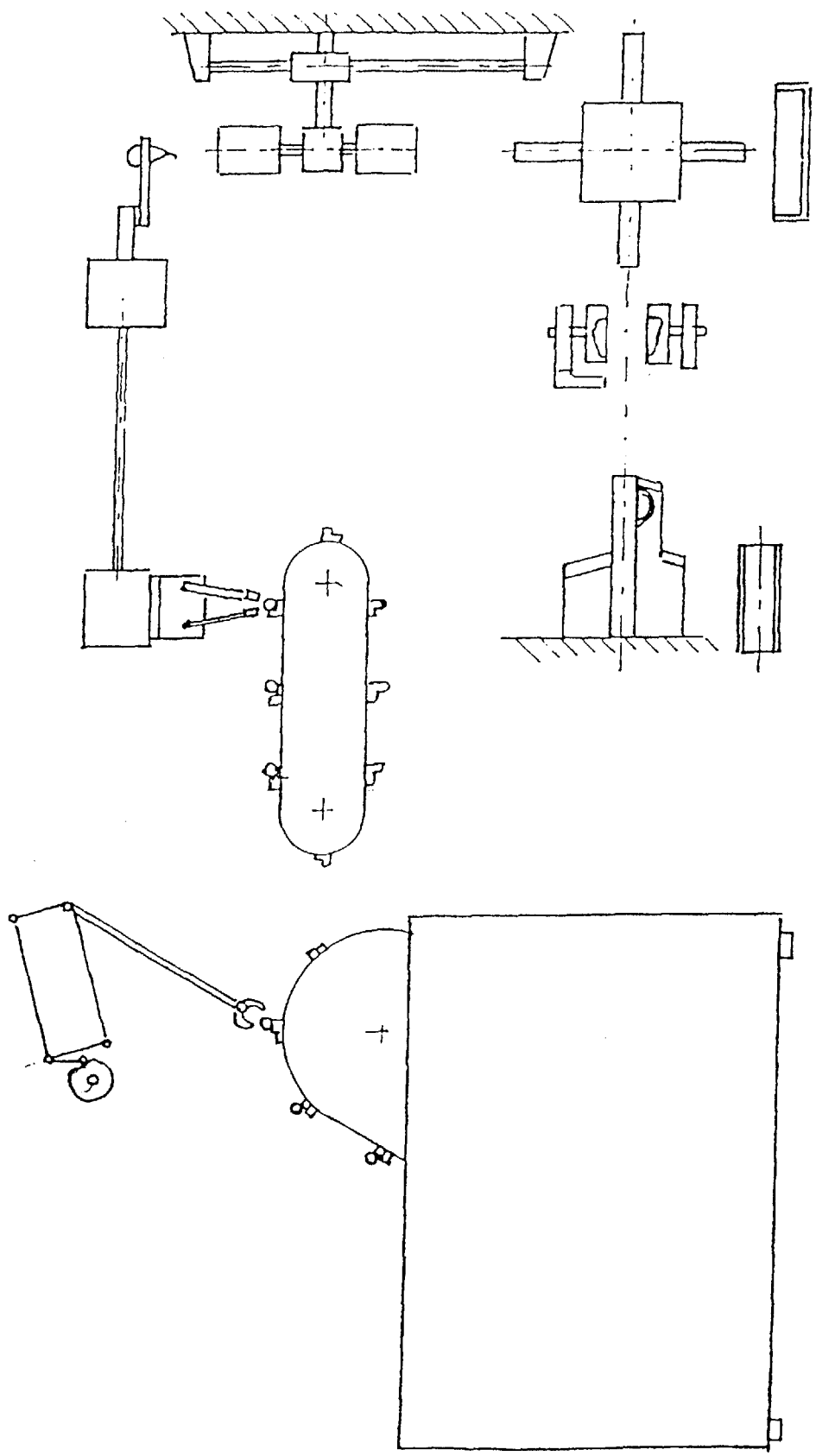
FIG. 26 illustrates the whole of the machine, which as shown comprises several modules.

Other mechanisms located inside the bed 52 transmit a vertical reciprocating movement (arrow F7) after the rotation (F6), and have two functions:

during the upward movement, to bring the upper funnel 49 near the pliers 34/*a–b* in order to prevent the pear from overturning (or from being improperly introduced in the funnel) when it is released by the pliers;

during the downward movement, to thrust the pear in the tubular tool 57 of the rotatable head of FIGS. 16 and 16/*a*.

The funnels or sleeves 49 have a configuration (conical hole suited to receive the pear and discharge the stem) and dimensions (depending on the "gauge") such as to be able to receive the pear handed over by the pliers 34/*a–b*, and are (each) provided with self-centering pliers 56 (FIG. 15) which are identical to the pliers 34/*a–b*.

Said pliers 56 have the function to put the pear in a vertical position, to maintain it in this position, and to hold it inside the funnel.

The working cycle steps are as follows:

A pear is released from the pliers 34/*a–b*.

The pear slides inside the upper funnel 49 of the device (with a downwardly directed stem).

Thereafter the pliers 56 stop the movement of the pear axis and align the latter; then, the device rotates by 180 degrees and moves downward thrusting the pear in the tubular tool 57.

The pliers 56 opens, thereby releasing (leaving) the pear on the tubular tool. Then, the device moves upward to receive another pear.

The cycle is repeated periodically in synchronism with all the other machine components.

The rotatable head (FIGS. 16–16/*a*) is moved intermittently, each time by 90 degrees, and comprises four identical tubular tools 57 consisting of tubes with a chamfered end (FIG. 19), in order to facilitate their penetration in the axial direction, inside the pear (FIG. 1/*a*). Exteriorly, said tubes are provided with two diametrically opposite fins 58 located in adequate positions, said fins acting as entrainment means when the tubular tool 57 is rotated, after they have penetrated the pulp of the pear.

The first station corresponds to the vertically upward directed tubular tool 57 and coincides with the station where the above described device thrusts the pear in the tubular tool 57. As may be seen in FIG. 1/*a*, the tubular tool 57 has a relatively small diameter; it axially crosses the whole pear, separating a "carrot" containing part of the flower, part of the central core, the stem and the woody part connecting the stem to the cartilage. enclosing the central core.

At this instant of time, the head rotates by 90 degrees and the pear is transferred to the second station, where the tubular tool 57 is rotated by known mechanisms, transmitting the motion through the shaft 59, from driving means located inside the machine bed 52. In this second station, different operations are performed on the pear according to known means and known techniques (see FIGS. 24–25), such as: external peeling by means of a small miller 67, removal of the remaining portion of the flower by means of the cutter 68, and end cutting by means of the cutter 69.

The head rotates again by 90 degrees and the tubular tool (supporting the pear) moves to the third station, in which its axis is directed vertically downward. In this station a compressed air jet is sent through the interior of the tubular tool, from the center to the outside, so that the "carrot" contained therein is "shot" out of the tubular tool and is collected in the underlying small basin (FIG. 20).

Therafter, the rotatable head turns by 90 degrees and the tubular tool is brought in the fourth and last station (horizontal tool, FIG. 16/*a*). In this station, a self-centering vice comprising two jaws 60 having a configuration complementary to the shape of the pear, grasps and axially translates the pear (FIGS. 21–22) on a spindle 61, which is coaxial and concentric with the tubular tool 57, until the central core of the pear coincides with the position of an arc-shaped blade 62, the latter being integral with the spindle 61.

Corresponding to the center line of the spindle 61, and in two diametrically opposite positions, there are provided two blades 63–64.

Blade 63 has a thickness slightly greater than the width of the arc-shaped blade 62.

Said blade 63 has a length extending from a position beyond the arc-shaped blade and as far as the machine bed wall, and is integral with the latter; its radius (starting from the center line of the spindle 61) is greater than the maximum radius of the pear.

Blade 63 is chamfered at its lance-shaped end, in order to cut in two parts half of the pear.

Blade 64 has the same shape as the foregoing and is also integral with the basement.

As regards its length, blade 64 is as long as the spindle 61. As regards its radius, it comprises a first portion whose radius is slightly greater than the radius of revolution of the arc-shaped blade; in its final portion it is identical to blade 63; moreover, it is chamfered in its lance-shaped parts.

The spindle is intermittently driven by a motor and rotates by 360 degrees in each cycle.

One of the jaws 60 of the vice, is provided with a bracket 65 acting as a knockout.

The operation is as follows:

The tubular tool 57 arrives at the fourth station and the vice 60 closes in order to grasp a pear.

The vice translates axially and brings the pear on the spindle 61, thereby clearing the tool 57. When the vice 60 is closed, the spindle 61 rotates by one turn, so that the arc-shaped blade 62 separates the central core from the remaining part of the pear pulp. The vice opens and the pear remains on the spindle since it is only partially cut. Thereafter, the vice 60 is translated to the tubular tool 57 in order to grasp a second pear. It closes, seizes said second pear, and moves linearly in order to bring the pear on the spindle 61 at the place of the foregoing pear.

The knockout bracket 65 comes in contact with the foregoing pear, thereby displacing it towards the location corresponding to the maximum radius of the blades 63–64, cutting in this manner the pear in two segments. Therefore, the segments and core separate and fall on a belt conveyor, which transfers them to a place where persons or means not included in the invention separate the edible from the inedible parts.

It must be observed that the means, parts or mechanisms which are not shown, due to the fact that they are considered already known, have neither been shown nor described because they are obvious for a skilled person and may be realized in any of the known forms.

The invention can be modified or realized according to different variants failing in the scope of the same inventive concept; moreover, all details may be replaced by other technically equivalent elements.

For instance, the pliers of FIG. 2—instead of the pliers of FIGS. 8–9–10–11—could put the pears on the chain conveyor of FIG. 7, with their stem oriented always in the same direction.

In practice,—the materials employed-provided they conform to the specific use—, and the dimensions and shapes, may be chosen at will, according to the requirements and the state of the art.

Moreover, all mechanisms necessary to move in synchronism the various parts of the machine, whether of a mechanical kind (Maltese cross; reversing gears, transmissions) or oleodynamic, electromechanic, and/or electronic (and programmable), may be realized according to known configurations.

The rapidity, precision and repeatability of the operations performed on the fruits, together with the low percentage of waste and the possibility to recover fruits with an irregular shape, all of which is made possible by the use of the present machine, make the latter competitive with respect to the state of the art.

What is claimed is:

1. A machine for peeling, removing the core and cutting a pear into segments, comprising:
    a device (1,2,3a,3b) for lifting and feeding each pear;
    a chain conveyor (16) for orienting and translating the pears, with adjustable elements (17a,17b,24) for positioning the pears horizontally and for maintaining them in this position during the translation;
    pliers (34a,34b), which are suited to displace each pear, from said chain conveyor (16) for orienting and translating the pears, to a device (49,50,51,56) for the clamping and concentric locating of the pears, insuring a position with vertical axis and an orientation in which the stem is directed downwardly;
    a device (49,50,51,56) for receiving, clamping and concentric locating the pears, which is also suited to thrust the pears onto a tubular tool (57) of a four-station rotatable head;
    a four-station rotatable head, wherein in each of these stations different operations are performed on the pears;
    a special vice (60,60) which is suited to take each pear from the fourth station of the rotatable head and transfer it to a station for the removal of the central core and the cutting into segments;
    a station for the removal of the central core and for cutting the pear into segments, formed by a blade (63,64) for cutting the pear into segments and a rotatable blade (62) for the removal of the core;
    a belt conveyor for moving away the edible parts and the waste, after said operations;
    and step motion and/or reciprocating motion mechanisms, which are suited to transmit with perfect synchronism, the necessary motion to each machine component, so as to carry out automatically all operations on the pears, starting from their feeding until their moving away.

2. A machine according to claim 1, wherein said device for lifting and feeding each pear comprises:
    a basin (1) for containing the pears, plunged in water mixed with suittable additives;
    a stepped chain conveyor (2), having a ladder configuration and moved intermittently, and suited to take a single pear from the bottom of the basin (1), for each step of the ladder, and to lift it above the basin (1);
    pliers (4/a–b) provided with pear seizing means and effecting a composite motion comprising lifting, lowering and a translation, in order to displace each pear from the upper end (3c) of said stepped chain conveyor (2) to said chain conveyor (16) for orienting and translating the pears.

3. A machine according to claim 2, wherein each step of the chain conveyor (2) comprises two parts;
    a fixed part (3/a);
    a slidable part (3/b) which is located on one side of the fixed part, and whose upper end can assume two positions, that is, a position slightly lower than the upper end of fixed part in order to retain a single pear, and a second position (3c) which is slightly higher,in order to lift the pear and release it by a sufficient amount, so that it can be seized by said pliers.

4. A machine according to claim 2, wherein the pliers (4/a–b) which seize and displace the pears, comprise:
    two jaws (4/a–b), one being fixed (4a) and the other (4b) pivotally connected and actuated by a linear pneumatic actuator (5) and suited to grasp the pears;
    an assembly (6,7,9,10,11) of levers and connecting rods, which are pivotally connected (8,12) and which are actuated in part by a pneumatic linear actuator (15) and in part by a cam (14), in such a way as to move the pliers (4a/–b) according to a composite motion comprising lifting and horizontal translation, so that the pliers will be positioned in two spaced apart positions, located at the same level, and corresponding to the pick up (3c) and release position (3d) of each pear.

5. A machine according to claim 1, wherein said chain conveyor (16) for translating and orienting each pear, comprises a plurality of elements formed by:
    a pair of rollers (17/a–b) located side by side, having horizontal axis and adjustable reciprocal distance;
    spindles (18/a–b) for supporting the rollers (17/a–b), simultaneously actuated by a motor and effecting a intermittent rotatory motion;
    pinions (32) integral with said roller supporting spindles (18/a–b), which are driven by a chain only during the stationary phase of the chain conveyor;
    a small plate (24) which is height-adjustable and is disposed between the rollers (17/a–b) in order to prevent a pear from wedging vertically between the rollers (17/a–b).

6. A machine according to claim 5, wherein each of said rollers (17/a–b) has a double taper, starting from the ends and converging at the middle of the roller's length.

7. A machine according to claim 5, wherein the roller supporting spindles (18/a–b) are pivoted at the ends of connecting rods (19/a–b), which are pivotally connected on their turn, at the other end, on a single axis or pin (20) located above the axes of the roller supporting spindles (18/a–b); and wherein the ends of said roller supporting spindles (18/a–b) are slidable.

8. A machine according to claim 7, wherein on the the pins (20) supporting the pivotally connecting rods (19a,19b) which carry the rollers (17a,17b), there are also pivotally connected—at each end—levers (31), the latter being almost horizontal and hinged at the other end, to said head portions (23), in such a way that, by lowering and lifting the levers (31), it is possible to change the reciprocal distance between the rollers.

9. A machine according to claim 1, wherein said pliers (34/a–b) suited to translate each pear from the chain conveyor (16) for orienting the pears, to the clamping device (46,50,51,56), are associated to an assembly formed by:
   a casing (47) containing known mechanisms, suited to transmit to a horizontal shaft (46), two different motions; that is,
   a rotary alternative movement corresponding to a rotation of 90 degrees, and an axial reciprocating movement;
   the pliers assembly comprising also
      two bevel gears (40, 41) which are idly mounted on said shaft (46) and face each other at a predetermined reciprocal distance, and which are integral with the supports (43–44) of said shaft (46);
      a sleeve (45) which is inserted on the shaft (46) and is rigidly connected to it, against axial movement and relative rotation, and which is arranged between said bevel gears (40, 41), said sleeve (45) being integral with a pin (42) which is orthogonal to said shaft (46);
      a bevel gear (39) which is idly mounted on said pin (42) and which can engage one or the other of said bevel gears (40, 41) depending on whether the said axially movable shaft (46) is displaced in one or the other direction;
      a plate (38) which is arranged perpendicularly to the outside face of the idle bevel gear (39) and which is integral with the latter;
      self-centering pliers (34a,34b) which are actuated by a pneumatic actuator (37).and are mounted on a face of said plate (38);
      the arrangement being such that by rotating the sleeve supporting shaft (46) when the idle bevel gear (39) is engaged with one of the fixed bevel gears (40, 41), the pliers supporting plate (38) moves from the horizontal to the vertical position and simultaneously rotates on its axis by 90 degrees; on the other hand, by engaging the idle gear (39) with the other fixed gear, the direction of rotation of the pliers supporting plate (38) is inverted.

10. A machine according to claim 9, wherein the whole pliers assembly may slide axially with a reciprocating movement, on horizontal guides, in order to reach two well defined positions for picking up or releasing a pear.

11. A machine according to claim 1, wherein said device (46,50,51,56) for the clamping and concentric locating of the pears, picks up the pears from the pliers (34a,34b) of claim 9 and is formed by:
   two funnels (49) comprising an upper and a lower one, diametrically oppositely mounted on a support (50) which is integral to a shaft (51), the latter rotating intermittently by 180 degrees each time;
   a support (53) of said intermittently rotating shaft (51), said support (53) moving in a reciprocating manner along vertical guides (54) integral with the machine bed (52);
   mechanisms suited to intermittently rotate the shaft (51) and the support (53)—carrying the shaft (51)—in a reciprocating manner;
   self centering pliers (56) which are actuated by a pneumatic actuator and are provided each on a respective funnel (49);
   wherein all components are moved in synchronism with the other machine assemblies, and each funnel (49) has an internal frustoconical hole corresponding to the "gauge" of the processed pears (33), and long enough in order to discharge without difficulties also the stem of the pear.

12. A machine according to claim 11, wherein the said four-station rotatable head has a tubular tool (57) onto which the pear (33) is thrust during the downward motion of the lower funnel (49).

13. A machine according to the claim 12, wherein the shaft (51) supporting the funnels (49), after a cycle comprising the downward and upward motion of the supports (53), rotates by 180 degrees, thereby being prepared to receive another pear in the funnel (49) emptied in the preceding cycle.

14. A machine according to claim 11, wherein said four-station rotatable head receives the pears from the device (46,50,51,56) and performs an intermittent rotary motion, each time of 90 degrees, obtained by mechanisms such as a Maltese cross or the like; said device (46,50,51,56) comprising:
   four mandrels carrying each a tubular tool (57) provided with entrainment fins (58);
   a motor driven shaft (59) which, by means of a bevel gear pair, sets the mandrel and the relative tubular tool (57) in rotation, in one station only.

15. A machine according to claim 14, wherein:
   in the first station the tubular vertical tool (57) is directed upwardly and said device (46,50,51,56) thrusts a pear on the tubular tool (57); and the tubular tool separates, in the axial direction, a "carrot" comprising part of the flower, of the central core and the stem, and also the whole woody part connecting the stem to the cartilage enclosing the central core;
   in the second station, the tubular tool is in a horizontal position and is set in rotation, so that the pear, which is "dragged" by the fins (58) provided on the outside surface of the tool (57) itself, is also rotated, while external operations such as peeling, removal of the remaining part of the flower, and end cutting are carried out on the pear;
   in the third station, the tubular tool (57) is vertically and downwardly directed, and a compressed air jet is "shot" inside the tubular tool (57), from the center to the outside, and a "carrot" is thereby "shot" out of the tubular tool (57) which contained it;
   in the fourth station, when the tubular tool (57) is horizontal, in a position diametrically opposite to that of the second station, the pear is seized by a vice (60) and is slipped off from the tubular tool (57) and is introduced on an adjacent spindle (61) which is concentric and coaxial with the tubular tool (57); said spindle (61) being part of a station in which the pears are cut into segments and their central core is removed; and wherein during said step of transfer of the pear (33), the aforesaid entrainment fins (58) provided on the tubular tool (57) are aligned and coplanar with the blades (63, 64) for cutting the pear, and a device is provided for this purpose, serving to align and orient the fins (58) with respect to the blades (63, 64) and to stop the mandrel at the same time.

16. A machine according to claim 15, wherein said vice (60) suited to take off each pear from the tubular tool (57), comprises:

two jaws (60), each with a cavity with a shape complementary to that of half a pear;

a mechanism which opens and closes said jaws (60) in order to seize or release the pears (33);

supports, for inserting thereon said jaws (60) in an adjustable way, in order to adapt the distance between the jaws in the closed condition of the vice, according to the "gauge" of the pears being processed;

guides, along which the vice (60) is translated coaxially to the axis of the tubular tool (57);

a bracket (65) acting as a knockout device, which is integral with one of the jaws (60) and is arranged and sized in such a way as to come in contact, during the successive translation, with the pear whose central core was removed in the foregoing cycle;

mechanisms, suited to reciprocally move the vice on said guides, translating it towards two different positions, coinciding with the pick up position, on the tubular tool (57), and the central core removal position on the spindle (61).

17. A machine according to claim 1, wherein said station for removing the central core and cutting the pear into segments, comprises:

a spindle (61) having an intermittent rotary motion, each time of 360 degrees, and on which, in an appropriate position, there is provided an arc-shaped blade (62);

two lance-shaped cutting blades (63–64), one of which is long and the other short, and which are integral with the machine bed (52); said blades (63–64) being aligned with the axis of the rotatable spindle (61) and being located on diametrically opposite positions with respect to the spindle (61); said blades being also in contact with the spindle, without rubbing action;

a motor for driving the spindle (61).

18. A machine according to claim 17, wherein said arc-shaped blade (62) integral with the spindle (61), is chamfered for providing sharpness, and has a dimension such that, when it is rotated by 360 degrees together with the spindle, it separates the central core from the remainder of the pear; said long lance-shaped blade (64) comprising a first portion starting from the end of the rotatable spindle (61) and terminating beyond the zone of the arc-shaped blade (62); said first portion being chamfered on the tip in order to facilitate its penetration in the pear, and its thickness being slightly greater than the width of the arc-shaped blade (62); the radial extension of said first portion being slightly greater than the radius of revolution of the arc-shaped blade (62); said first portion having an aperture in the region of the arc-shaped blade (62), in order to allow rotation of the latter;

a second portion of the long blade (64) having the same thickness as the first portion, a width greater than the pear maximum radius, and a lance shape with chamfered tip.

19. A machine according to claims 17, wherein the short lance-shaped blade (63), has the same shape and dimension as the second portion of the long blade (64), and the diameter of the rotatable spindle (61) is identical or slightly less than the outside diameter of the tubular tool (57); the machine comprising also a belt conveyor which collects and moves away the two halves of the pear, which were cut by the lance-shaped blades (63, 64) and which, together with the core, fall by gravity on said belt conveyor.

* * * * *

UNITED STATES PATENT AND TRADEMARK OFFICE
CERTIFICATE OF CORRECTION

PATENT NO.   : 6,237,475 B1
DATED        : May 29, 2001
INVENTOR(S)  : Ascari et al.

Page 1 of 1

It is certified that error appears in the above-identified patent and that said Letters Patent is hereby corrected as shown below:

<u>Column 13,</u>
Line 10, after "slidable" insert -- inside horizontal slots (27/a-b) obtained on head portions (23) supporting the whole assembly --.

Signed and Sealed this

Nineteenth Day of February, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,237,475 B1
DATED        : May 29, 2001
INVENTOR(S)  : Carlo Ascari et al.

It is certified that error appears in the above-identified patent and that said Letters Patent is hereby corrected as shown below:

<u>Column 16,</u>
Line 31, change "claims 17" to -- claim 18 --.

Signed and Sealed this

First Day of July, 2003

JAMES E. ROGAN
*Director of the United States Patent and Trademark Office*